United States Patent
Choi

(10) Patent No.: US 9,905,881 B2
(45) Date of Patent: Feb. 27, 2018

(54) ELECTRODE ASSEMBLY HAVING PROTECTION TAPE AND RECHARGEABLE BATTERY INCLUDING THE SAME

(71) Applicant: Samsung SDI Co., Ltd., Yongin-si, Gyeonggi-do (KR)

(72) Inventor: Hyun-Jin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 237 days.

(21) Appl. No.: 14/945,075

(22) Filed: Nov. 18, 2015

(65) Prior Publication Data

US 2016/0149221 A1 May 26, 2016

(30) Foreign Application Priority Data

Nov. 25, 2014 (KR) .......................... 10-2014-0165620

(51) Int. Cl.
 *H01M 2/02* (2006.01)
 *H01M 10/04* (2006.01)
 *H01M 2/26* (2006.01)

(52) U.S. Cl.
 CPC ......... *H01M 10/0431* (2013.01); *H01M 2/26* (2013.01)

(58) Field of Classification Search
 CPC ...... H01M 2/26; H01M 4/0404; H01M 4/366; H01M 4/64; H01M 10/0431; H01M 2004/028
 See application file for complete search history.

(56) References Cited

U.S. PATENT DOCUMENTS

| | | | | |
|---|---|---|---|---|
| 8,080,329 B1* | 12/2011 | Skinlo | ...................... | H01M 2/16 429/129 |
| 9,178,201 B2* | 11/2015 | Lee | ......................... | H01M 2/145 |
| 9,478,824 B2* | 10/2016 | Chung | ................. | H01M 2/0207 |
| 2013/0260221 A1* | 10/2013 | Yoshitake | ............. | H01M 2/024 429/179 |

FOREIGN PATENT DOCUMENTS

KR 10-0551397 B1 2/2006
KR 10-2013-0070624 A 6/2013

* cited by examiner

*Primary Examiner* — Raymond Alejandro
(74) *Attorney, Agent, or Firm* — Knobbe Martens Olson & Bear LLP

(57) ABSTRACT

An electrode assembly and a rechargeable battery that can prevent an active material from separating and prevent a short circuit and damage due to a tab that is attached to a current collector are provided. The electrode assembly includes a positive electrode, a negative electrode, and a separator that is disposed between the positive electrode and the negative electrode. The positive electrode has a positive electrode coating portion in which a positive electrode active material layer is formed and a positive electrode uncoated region in which a positive electrode active material layer is not formed, and a positive electrode tab is attached to the positive electrode uncoated region. A first positive electrode protection tape is attached to the positive electrode uncoated region, and the first positive electrode protection tape includes a first cover that covers the side end of the positive electrode coating portion and a second cover that is extended from the first cover and that covers both the positive electrode tab and the positive electrode uncoated region.

13 Claims, 9 Drawing Sheets

ELECTRODE ASSEMBLY HAVING PROTECTION TAPE AND RECHARGEABLE BATTERY INCLUDING THE SAME

RELATED APPLICATIONS

This application claims priority to and the benefit of Korean Patent Application No. 10-2014-0165620 filed in the Korean Intellectual Property Office on Nov. 25, 2014, the entire contents of which are incorporated herein by reference.

BACKGROUND

Field

The present invention relates to an electrode assembly and a rechargeable battery.

More particularly, the present invention relates to an electrode assembly and a rechargeable battery having a protection tape.

Description of the Related Art

A rechargeable battery can be repeatedly charged and discharged, unlike a primary battery that is incapable of being recharged.

A rechargeable battery with a small capacity is used for a small portable electronic device like a mobile phone, a laptop computer, and a camcorder, and a rechargeable battery with a large capacity is widely used as a power source for driving a motor of a hybrid vehicle.

As representative rechargeable batteries, a nickel-cadmium (Ni—Cd) battery, a nickel-metal hydride (Ni-MH) battery, a lithium (Li) battery, and a lithium ion (Li-ion) battery exist.

Particularly, the Li-ion rechargeable battery has an operation voltage that is higher by about 3 times that of a Ni—Cd battery and a Ni-MH battery that are widely used as portable electronic equipment power sources.

Further, due to high energy density per unit weight, the Li-ion rechargeable battery has been widely used.

The rechargeable battery generally uses a lithium-based oxide as a positive electrode active material and a carbon material as a negative electrode active material.

In general, the rechargeable battery is classified into a liquid electrolyte battery and a polymer electrolyte battery according to a kind of an electrolyte, a battery using a liquid electrolyte is referred to as a Li-ion battery, and a battery using a polymer electrolyte is referred to as a lithium polymer battery.

Such rechargeable batteries have an electrode assembly in which a separator is interposed between a positive electrode and a negative electrode, and when an active material layer of a positive electrode or a negative electrode is separated from a current collector, charge and discharge efficiency is reduced.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide an electrode assembly and a rechargeable battery having advantages of being capable of preventing an active material from separating and preventing a short circuit and damage due to a tab that is attached to a current collector.

An exemplary embodiment of the present invention provides an electrode assembly including a positive electrode, a negative electrode, and a separator that is disposed between the positive electrode and the negative electrode. The positive electrode has a positive electrode coating portion in which a positive electrode active material layer is formed and a positive electrode uncoated region in which a positive electrode active material layer is not formed, and a positive electrode tab is attached to the positive electrode uncoated region. A first positive electrode protection tape is attached to the positive electrode uncoated region, and the first positive electrode protection tape includes a first cover that covers the side end of the positive electrode coating portion and a second cover that is extended from the first cover and that covers both the positive electrode tab and the positive electrode uncoated region.

The first cover may be located at the positive electrode coating portion side based on a boundary line of the positive electrode uncoated region and the positive electrode coating portion, the second cover may be located at the positive electrode uncoated region side based on the boundary line, and an area of the second cover may be three times to six times greater than that of the first cover.

The positive electrode may include a positive electrode current collector that is formed with a thin metal plate and a positive electrode active material layer that is attached to a positive electrode current collector, and the positive electrode active material layer may be formed at both surfaces of the positive electrode current collector. The first positive electrode protection tape may include a first surface that covers one side surface of the positive electrode, a second surface that is bent from the first surface to cover the side end of the positive electrode, and a third surface that is bent from the second surface to cover the other side surface, which is an opposite surface of the one side surface. The first surface may cover the positive electrode tab and the side end of a positive electrode coating portion that is formed at one side surface of the positive electrode, and the third surface may cover the side end of a positive electrode coating portion that is formed at the other side surface of the positive electrode and a portion in which the positive electrode tab and the positive electrode current collector are welded.

The first positive electrode protection tape may include a tab cover that is protruded in a length direction of the positive electrode tab, and the tab cover may enclose a positive electrode tab that is protruded from the positive electrode current collector.

The positive electrode may include a positive electrode current collector that is formed with a thin metal plate and a positive electrode active material layer that is attached to the positive electrode current collector, and the positive electrode active material layer may be formed at both surfaces of the positive electrode current collector. The first positive electrode protection tape may be attached to one surface of the positive electrode, and a second positive electrode protection tape may be attached to the other surface of the positive electrode. The second positive electrode protection tape may include a third cover that covers the side end of the positive electrode coating portion, and a fourth cover that is extended from the third cover and that covers a portion in which the positive electrode tab and the positive electrode current collector are welded.

The negative electrode may have a negative electrode coating portion in which a negative electrode active material layer is formed and a negative electrode uncoated region in which a negative electrode active material layer is not formed, and a negative electrode tab may be attached to the negative electrode uncoated region. A first negative electrode protection tape may be attached to the negative electrode uncoated region, and the first negative electrode protection tape may include a first cover that covers the side end of the negative electrode coating portion and a second cover that is extended from the first cover and that covers both the negative electrode tab and the negative electrode uncoated region.

Another embodiment of the present invention provides a rechargeable battery including: an electrode assembly including a positive electrode, a negative electrode, and a separator that is disposed between the positive electrode and the negative electrode; a case that receives the electrode assembly; and a cap plate that is coupled to the case and in which a terminal that is electrically connected to the electrode assembly is installed. The positive electrode has a positive electrode coating portion in which a positive electrode active material layer is formed and a positive electrode uncoated region in which a positive electrode active material layer is not formed, and a positive electrode tab is attached to the positive electrode uncoated region, a first positive electrode protection tape is attached to the positive electrode uncoated region, and the first positive electrode protection tape includes a first cover that covers the side end of the positive electrode coating portion and a second cover that is extended from the first cover and that covers both the positive electrode tab and the positive electrode uncoated region.

The first cover may be located at the positive electrode coating portion side based on a boundary line of the positive electrode uncoated region and the positive electrode coating portion, the second cover may be located at the positive electrode uncoated region side based on the boundary line, and an area of the second cover may be three times to six times greater than that of the first cover.

The positive electrode may include a positive electrode current collector that is formed with a thin metal plate and a positive electrode active material layer that is attached to the positive electrode current collector, and the positive electrode active material layer may be formed at both surfaces of the positive electrode current collector. The first positive electrode protection tape may include a first surface that covers one side surface of the positive electrode, a second surface that is bent from the first surface to cover the side end of the positive electrode, and a third surface that is bent from the second surface to cover the other side surface, which is an opposite surface of the one side surface. The first surface may cover the positive electrode tab and the side end of a positive electrode coating portion that is formed at one side surface of the positive electrode, and the third surface may cover the side end of a positive electrode coating portion that is formed at the other side surface of the positive electrode and a portion in which the positive electrode tab and the positive electrode current collector are welded.

The first positive electrode protection tape may include a tab cover that is protruded in a length direction of the positive electrode tab, and the tab cover may enclose a positive electrode tab that is protruded from the positive electrode current collector.

The positive electrode may include a positive electrode current collector that is formed with a thin metal plate and a positive electrode active material layer that is attached to the positive electrode current collector. The positive electrode active material layer may be formed at both surfaces of the positive electrode current collector, the first positive electrode protection tape may be attached to one surface of the positive electrode, and a second positive electrode protection tape may be attached to the other surface of the positive electrode. The second positive electrode protection tape may include a third cover that covers the side end of the positive electrode coating portion and a fourth cover that is extended from the third cover and that covers a portion in which the positive electrode tab and the positive electrode current collector are welded.

The negative electrode may have a negative electrode coating portion in which a negative electrode active material layer is formed and a negative electrode uncoated region in which a negative electrode active material layer is not formed, and a negative electrode tab may be attached to the negative electrode uncoated region. A first negative electrode protection tape may be attached to the negative electrode uncoated region, and the first negative electrode protection tape may include a first cover that covers the side end of the negative electrode coating portion and a second cover that is extended from the first cover and that covers both the negative electrode tab and the negative electrode uncoated region.

According to an exemplary embodiment of the present invention, separation of an active material and a short circuit and damage due to a positive electrode tab can be prevented with one protection tape.

DETAILED DESCRIPTION OF CERTAIN INVENTIVE EMBODIMENTS

Figure 1:
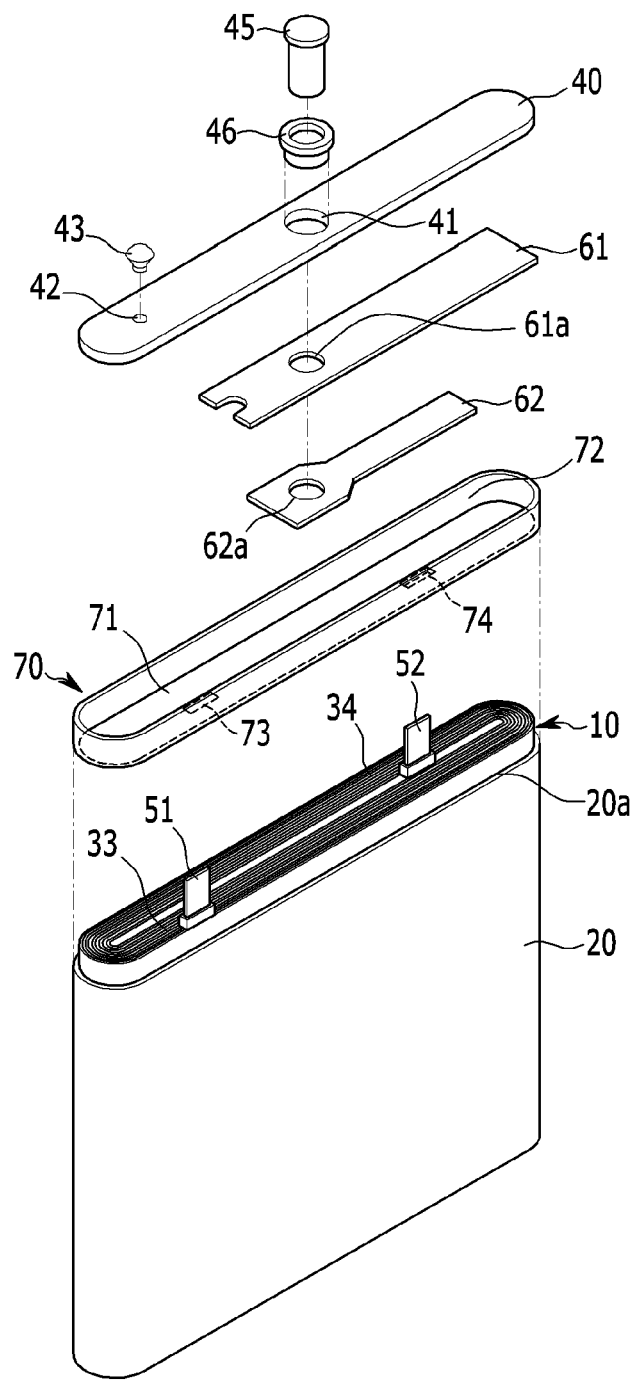
FIG. 1 is an exploded perspective view illustrating a rechargeable battery according to a first exemplary embodiment of the present invention.

Hereinafter, exemplary embodiments of the present invention will be described in detail with reference to the attached drawings such that the present invention can be easily put into practice by those skilled in the art.

As those skilled in the art would realize, the described embodiments may be modified in various different ways, all without departing from the spirit or scope of the present invention. Like reference numerals designate like elements throughout the specification and the drawings.

Figure 2:
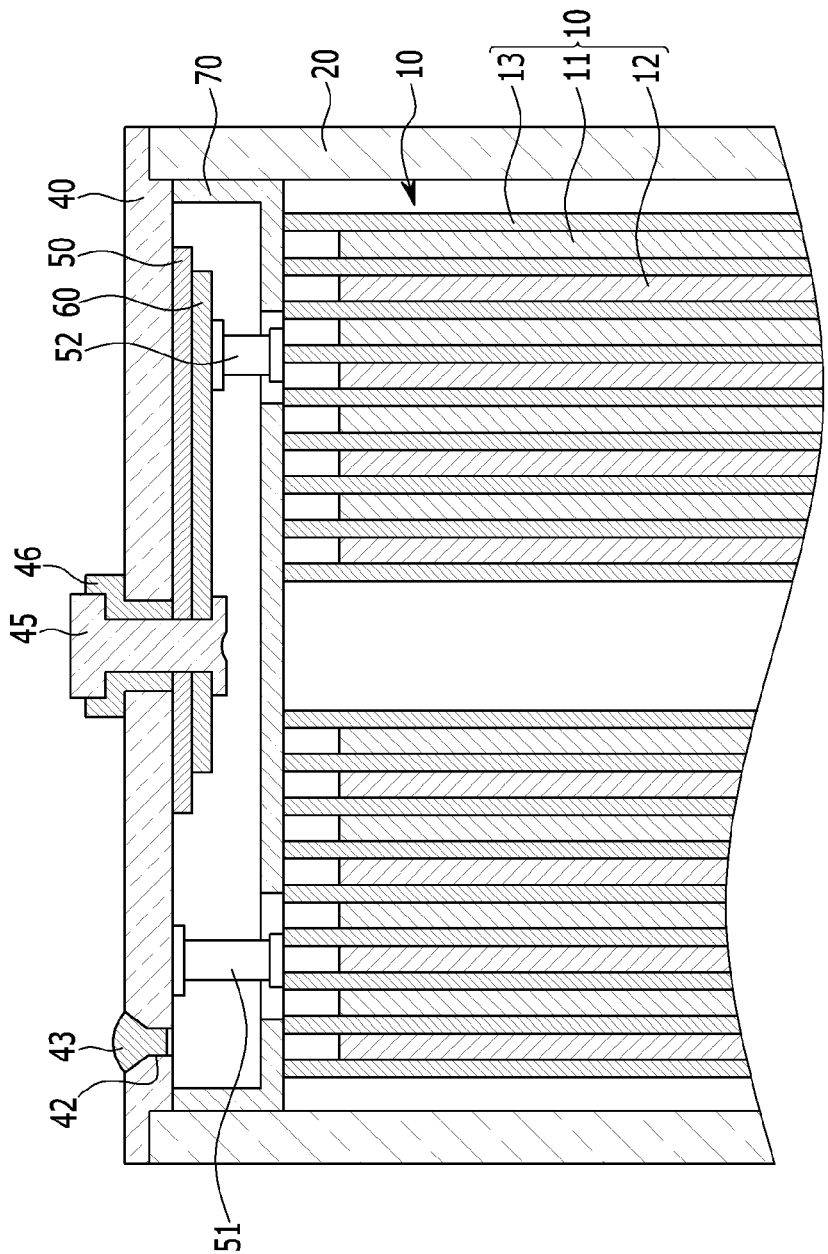
FIG. 2 is a partially cross-sectional view illustrating a rechargeable battery according to a first exemplary embodiment of the present invention.

FIG. 1 is an exploded perspective view illustrating a rechargeable battery according to a first exemplary embodiment of the present invention, and FIG. 2 is a cross-sectional view illustrating a rechargeable battery according to the first exemplary embodiment of the present invention.

Referring to FIGS. 1 and 2, a rechargeable battery 101 according to the present exemplary embodiment includes an electrode assembly 10, a case 20, and a cap plate 40. Hereinafter, a rectangular battery is illustrated, but the present invention is not limited thereto and the present invention may be applied to various rechargeable batteries such as a pouch battery and a lithium polymer battery.

The electrode assembly 10 includes a positive electrode (first electrode) 11, a negative electrode (second electrode) 12, and a separator 13 that is disposed between the positive electrode 11 and the negative electrode 12. The positive electrode 11 and the negative electrode 12 are spiral-wound with the separator 13, which is an insulator, interposed therebetween to have a jelly roll form.

However, the present invention is not limited thereto, and an electrode assembly may be formed in a structure that is sequentially layered with a separator interposed between a positive electrode and a negative electrode.

A positive electrode tab (first tab) 51 is fixed to the positive electrode 11, and a negative electrode tab (second tab) 52 is fixed to the negative electrode 12. The positive electrode tab 51 and the negative electrode tab 52 are disposed parallel to a winding axis, and in the electrode assembly 10, in a cross-section portion in which a layer is exposed, the positive electrode tab 51 and the negative electrode tab 52 are installed to protrude.

The positive electrode tab 51 and the negative electrode tab 52 are protruded in a direction in which an opening is formed in the case 20 and are separately disposed by a predetermined distance to be electrically insulated.

The positive electrode tab 51 is made of an electrically conductive material such as nickel and aluminum, and is electrically connected to the cap plate 40. The negative electrode tab 52 is made of an electrically conductive material such as copper and nickel, and is electrically connected to a terminal 45.

An opening 20a is formed at an upper end portion of the case 20 to insert the electrode assembly 10. The case 20 provides a space that houses the electrode assembly 10 and an electrolyte solution therein, and is electrically connected to the positive electrode tab 51. The case 20 may be produced by processing aluminum or an aluminum alloy with a method such as metal deep drawing.

The cap plate 40 is coupled to the opening 20a of the case 20 to close and seal the case 20, and is made of an electrically conductive metal material such as aluminum or an aluminum alloy. The positive electrode tab 51 is bonded by welding at a lower surface of the cap plate 40, and the cap plate 40 is charged as a positive electrode.

An insulating case 70 is installed between the electrode assembly 10 and the cap plate 40. The insulating case 70 includes a base 71 and a side wall 72 that is protruded from the side end of the base 71. The base 71 is formed in a plate shape, and the base 71 has a first tab hole 73 through which the positive electrode tab 51 penetrates and a second tab hole 74 through which the negative electrode tab 52 penetrates. The side wall 72 is connected along a periphery of the base 71.

The terminal 45 is located at the center of the cap plate 40 and is installed to penetrate a terminal hole 41 that is formed in the cap plate 40. The terminal 45 is installed in the cap plate 40 through an insulating gasket 46, and the insulating gasket 46 electrically insulates the terminal 45 and the cap plate 40 while enclosing a circumference of the terminal 45.

An electrolyte solution injection hole 42, which is a passage for injecting an electrolyte solution into the case 20, is provided in the cap plate 40, and a stopper 43 is insertion installed in the electrolyte solution injection hole 42 to close it.

The terminal 45 is installed to penetrate the cap plate 40 and a connecting plate 62, and the connecting plate 62 is disposed between the electrode assembly 10 and the cap plate 40 at the inside of the case 20. The connecting plate 62 is formed with a plate shape, and a terminal hole 62a through which the terminal 45 penetrates is formed in the connecting plate 62.

When it is installed to penetrate the cap plate 40 and the connecting plate 62, the terminal 45 is fixed to the cap plate 40 and the connecting plate 62 by riveting. The negative electrode tab 52 is fixed to the connecting plate 62 by welding, and thus the terminal 45 may be electrically connected to the negative electrode 12 through the connecting plate 62 and the negative electrode tab 52.

An insulating plate 61 that insulates the connecting plate 62 from the cap plate 40 is installed between the cap plate 40 and the connecting plate 62. The insulating plate 61 is formed as a plate having an electrical insulating property and is disposed parallel to the cap plate 40. A terminal hole 61a through which the terminal 45 penetrates is formed in the insulating plate 61.

Figure 3:
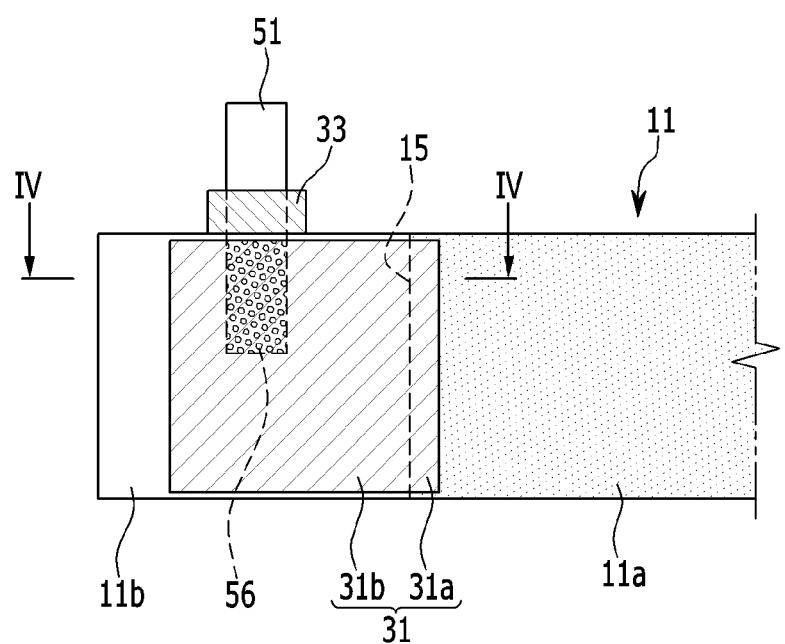
FIG. 3 is a top plan view illustrating a portion of a positive electrode according to a first exemplary embodiment of the present invention.
Figure 4:
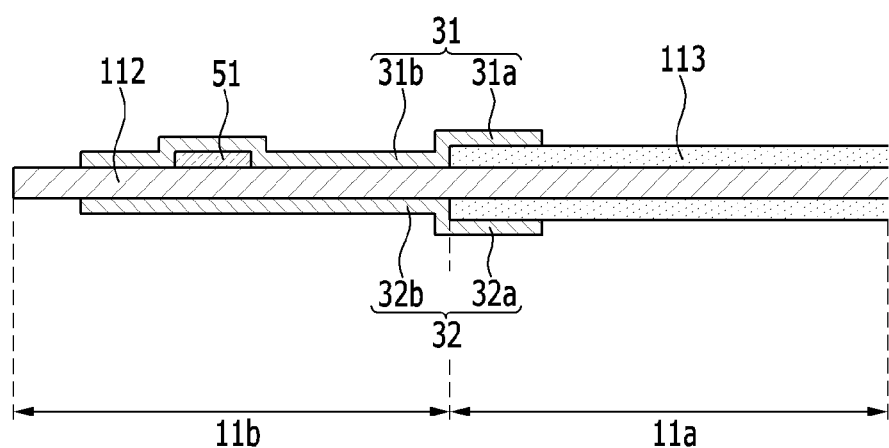
FIG. 4 is a cross-sectional view taken along line IV-IV of FIG. 3.

FIG. 3 is a top plan view illustrating a portion of a positive electrode according to a first exemplary embodiment of the present invention, and FIG. 4 is a cross-sectional view taken along line IV-IV of FIG. 3.

Referring to FIGS. 3 and 4, the positive electrode 11 includes a positive electrode current collector 112 that is formed with a thin metal plate, and a positive electrode active material layer 113 that is attached to the positive electrode current collector 112. The positive electrode current collector 112 may be made of aluminum, and the positive electrode active material layer 113 may be made of a lithium-based oxide.

A positive electrode active material is coated at both surfaces of the positive electrode current collector 112, and the positive electrode 11 has a positive electrode coating portion 11a where the positive electrode active material layer 113 is coated and a positive electrode uncoated region 11b where the positive electrode active material layer 113 is not coated. The positive electrode uncoated region 11b is located at an end portion of one side of a length direction of the positive electrode 11, and the positive electrode tab 51 is attached to the positive electrode uncoated region 11b by ultrasonic welding or the like. An insulating tape 33 for insulating is wound around the positive electrode tab 51.

Accordingly, a welding portion 56 is formed in the positive electrode uncoated region 11b and the positive electrode tab 51.

A first positive electrode protection tape 31 is attached to the positive electrode uncoated region 11b, and the first positive electrode protection tape 31 includes a first cover 31a that covers the side end of the positive electrode coating portion 11a and a second cover 31b that is extended from the first cover 31a and that covers both the positive electrode tab 51 and the positive electrode uncoated region 11b.

The first cover 31a is located at the positive electrode coating portion 11a side based on a boundary line 15 of the positive electrode uncoated region 11b and the positive electrode coating portion 11a, and the second cover 31b is located at the positive electrode uncoated region 11b side based on the boundary line 15. The first cover 31a is extended from the side end of the positive electrode coating portion 11a to the inside of the positive electrode coating portion 11a with a predetermined width. The second cover 31b is formed more widely than the first cover 31a, and an area of the second cover 31b may be three times to six times greater than that of the first cover 31a.

The first cover 31a and the second cover 31b are integrally formed, and the first positive electrode protection tape 31 may be formed with an approximately rectangular film. The first positive electrode protection tape 31 may be formed with a Teflon resin, a polypropylene resin, or a polyethylene resin. Further, the first positive electrode protection tape 31 may be made of a porous material into which an electrolyte solution may penetrate. The first positive electrode protection tape 31 may have a thickness of 15 μm to 30 μm.

As in the first exemplary embodiment, when the first positive electrode protection tape 31 is installed, an active material layer can be prevented from separating using one protection tape and the electrode assembly 10 can be prevented from being damaged by the positive electrode tab 51. Further, because only one tape is installed, a process is simplified and thus productivity can be improved.

The first positive electrode protection tape 31 is attached to one surface of the positive electrode 11, and a second positive electrode protection tape 32 is attached to the other surface of the positive electrode 11 advancing in a direction opposite to that of one surface. The second positive electrode protection tape 32 includes a third cover 32a that covers the side end of the positive electrode coating portion 11a, and a fourth cover 32b that is extended from the third cover 32a and that covers a portion where the positive electrode tab 51 and the positive electrode current collector 112 are welded. The third cover 32a is located at the positive electrode coating portion 11a side at a boundary line of the positive electrode uncoated region 11b and the positive electrode coating portion 11a, and the fourth cover 32b is located at the positive electrode uncoated region 11b side based on a boundary line. The third cover 32a is extended from the side end of the positive electrode coating portion 11a to the inside of the positive electrode coating portion 11a with a predetermined width. The second positive electrode protection tape 32 prevents the positive electrode active material layer 113 from separating and protects a portion where the positive electrode current collector 112 and the positive electrode tab 51 are welded.

Figure 5:
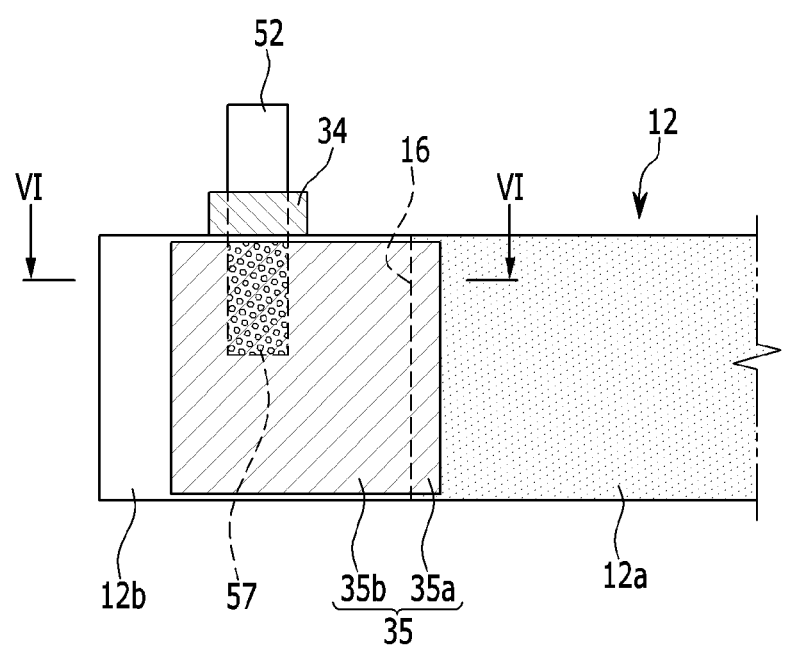
FIG. 5 is a top plan view illustrating a portion of a negative electrode according to a first exemplary embodiment of the present invention.
Figure 6:
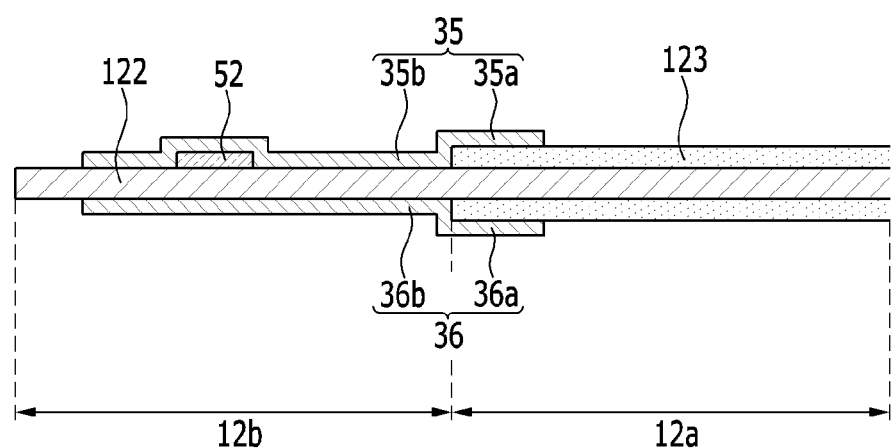
FIG. 6 is a cross-sectional view taken along line VI-VI of FIG. 5.

FIG. 5 is a top plan view illustrating a portion of a negative electrode according to a first exemplary embodiment of the present invention, and FIG. 6 is a cross-sectional view taken along line VI-VI of FIG. 5.

Referring to FIGS. 5 and 6, the negative electrode 12 according to the second exemplary embodiment includes a negative electrode current collector 122 that is formed with a thin metal plate, and a negative electrode active material layer 123 that is attached to the negative electrode current collector 122. The negative electrode current collector 122 may be made of copper, and the negative electrode active material layer 123 may be made of a carbon-based material.

A negative electrode active material is coated at both surfaces of the negative electrode current collector 122, and the negative electrode 12 has a negative electrode coating portion 12a where the negative electrode active material layer 123 is formed and a negative electrode uncoated region 12b where the negative electrode active material layer 123 is not coated. The negative electrode uncoated region 12b is located at an end portion of one side of a length direction of the negative electrode 12, and the negative electrode tab 52 is attached to the negative electrode uncoated region 12b by ultrasonic welding or the like. Accordingly, a welding portion 57 is formed in the negative electrode uncoated region 12b and the negative electrode tab 52. An insulating tape 34 for insulating is wound around the negative electrode tab 52.

A first negative electrode protection tape 35 is attached to the negative electrode uncoated region 12b, and the first negative electrode protection tape 35 includes a first cover 35a that covers the side end of the negative electrode coating portion 12a and a second cover 35b that is extended from the first cover 35a and that covers both the negative electrode tab 52 and the negative electrode uncoated region 12b. The first cover 35a is located at the negative electrode coating portion 12a side based on a boundary line 16 of the negative electrode uncoated region 12b and the negative electrode coating portion 12a, and the second cover 35b is located at the negative electrode uncoated region 12b side based on the boundary line 16. The first cover 35a is extended from the side end of the negative electrode coating portion 12a to the inside of the negative electrode coating portion 12a with a predetermined width. The second cover 35b is formed more widely than the first cover 35a, and an area of the second cover 35b may be three times to six times greater than that of the first cover 35a.

The first cover 35a and the second cover 35b are integrally formed, and the first negative electrode protection tape 35 may be formed with an approximately rectangular film. The first negative electrode protection tape 35 may be formed with a Teflon resin, a polypropylene resin, or a polyethylene resin. Further, the first negative electrode protection tape 35 may be made of a porous material into which an electrolyte solution can penetrate. The first negative electrode protection tape 35 may have a thickness of 15 μm to 30 μm.

As in the first exemplary embodiment, when the first negative electrode protection tape 35 is installed, an active material layer can be prevented from separating using one protection tape and the electrode assembly 10 can be prevented from being damaged by the negative electrode tab 52. Further, because only one tape is installed, a process is simplified and thus productivity can be improved.

The first negative electrode protection tape 35 is attached to one surface of the negative electrode 12, and a second negative electrode protection tape 36 is attached to the other surface of the negative electrode 12 advancing in a direction opposite to that of the one surface. The second negative electrode protection tape 36 includes a third cover 36a that covers the side end of the negative electrode coating portion 12a, and a fourth cover 36b that is extended from the third cover 36a and that covers a portion where the negative electrode tab 52 and the negative electrode current collector 122 are welded. The third cover 36a is located at the negative electrode coating portion 12a side at the boundary line 16 of the negative electrode uncoated region 12b and the negative electrode coating portion 12a, and the fourth cover 36b is located at the negative electrode uncoated region 12b side based on the boundary line 16. The second negative electrode protection tape 36 prevents the negative electrode active material layer 123 from separating and protects a portion where the negative electrode current collector 122 and the negative electrode tab 52 are welded.

Figure 7:
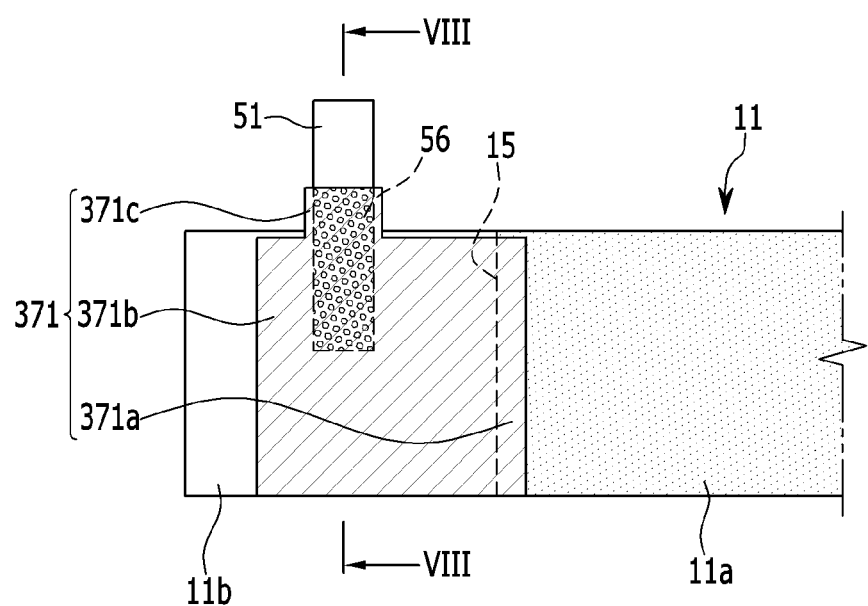
FIG. 7 is a top plan view illustrating a portion of a positive electrode according to a second exemplary embodiment of the present invention.
Figure 8:
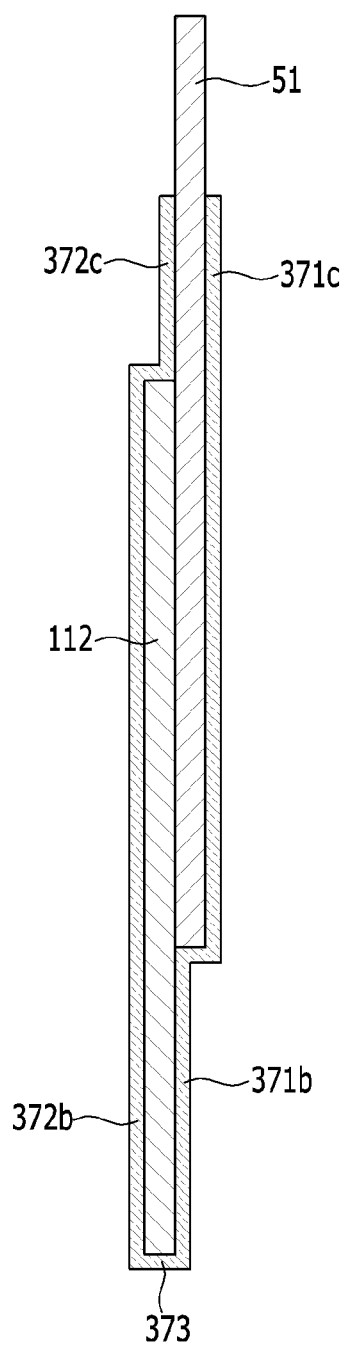
FIG. 8 is a cross-sectional view taken along line VII-VII of FIG. 7.
Figure 9:
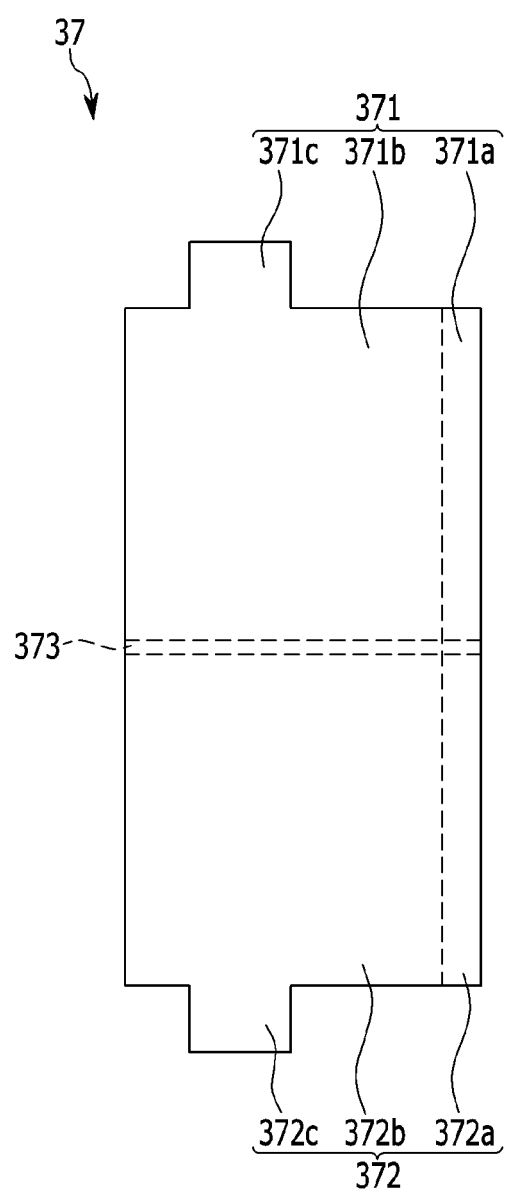
FIG. 9 is a developed diagram illustrating a first positive electrode protection tape according to a second exemplary embodiment of the present invention.

FIG. 7 is a top plan view illustrating a portion of a positive electrode according to a second exemplary embodiment of the present invention, FIG. 8 is a cross-sectional view taken along line VIII-VIII of FIG. 7, and FIG. 9 is a developed diagram illustrating a first positive electrode protection tape according to the second exemplary embodiment of the present invention.

Referring to FIGS. 7 to 9, a rechargeable battery according to the second exemplary embodiment is formed with the same structure as that of the rechargeable battery according to the first exemplary embodiment, except for a structure of a protection tape, and thus a description of the same structure will be omitted.

A first positive electrode protection tape 37 includes a first surface 371 that covers one side surface of the positive electrode 11, a second surface 373 that is bent from the first surface 371 and that covers the side end of the positive electrode 11, and a third surface 372 that is bent from the second surface 373 and that covers the other side surface, which is an opposite surface of the one side surface of the positive electrode 11. Here, the first surface 371, the second surface 373, and the third surface 372 are integrally formed.

The first surface 371 covers the positive electrode tab 51 and the side end of the positive electrode coating portion 11a that is formed at one side surface, and the first surface 371 includes a first cover 371a that covers the side end of the positive electrode coating portion 11a, a second cover 371b that is extended from the first cover 371a and that covers both the positive electrode tab 51 and the positive electrode uncoated region 11b, and a tab cover 371c that is protruded in a length direction of the positive electrode tab 51 from the second cover 371b.

The first cover 371a is located at the positive electrode coating portion 11a side based on the boundary line 15 of the positive electrode uncoated region 11b and the positive electrode coating portion 11a, and the second cover 371b is located at the positive electrode uncoated region 11b side based on the boundary line 15. The tab cover 371c is protruded in a direction in which the positive electrode tab 51 is extended to enclose a portion of the positive electrode tab 51, and performs a function of preventing the positive electrode tab 51 from being short-circuited.

The third surface 372 covers the side end of the positive electrode coating portion 11a that is formed at the other side surface and a portion where the positive electrode tab 51 and the positive electrode current collector 112 are welded, and the third surface 372 includes a third cover 372a that covers the side end of the positive electrode coating portion 11a, a fourth cover 372b that is extended from the third cover 372a and that covers both the positive electrode tab 51 and the positive electrode uncoated region 11b, and a tab cover 372c that is protruded in a length direction of the positive electrode tab 51 from the fourth cover 372b.

The third cover 372a is located at the positive electrode coating portion 11a side based on the boundary line 15 of the positive electrode uncoated region 11b and the positive electrode coating portion 11a, and the fourth cover 372b is located at the positive electrode uncoated region 11b side based on the boundary line 15. The tab cover 372c is protruded in a direction to which the positive electrode tab 51 is extended to enclose a portion of the positive electrode tab 51, and performs a function of preventing the positive electrode tab 51 from short-circuiting.

As described above, according to the second exemplary embodiment, when using one protection tape, the entirety of both surfaces of a positive electrode can be protected and a tab cover that encloses a positive electrode tab is formed such that the positive electrode tab can be prevented from being short-circuited.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly comprising a positive electrode, a negative electrode, and a separator that is disposed between the positive electrode and the negative electrode,
    wherein the positive electrode has a positive electrode coating portion in which a positive electrode active material layer is formed and a positive electrode uncoated region in which a positive electrode active material layer is not formed, and a positive electrode tab is attached to the positive electrode uncoated region,
    a first positive electrode protection tape is attached to the positive electrode uncoated region, and
    the first positive electrode protection tape comprises a first cover that covers the side end of the positive electrode coating portion and a second cover that is extended from the first cover and that covers both the positive electrode tab and the positive electrode uncoated region.

2. The electrode assembly of claim 1, wherein the first cover is located at the positive electrode coating portion side based on a boundary line of the positive electrode uncoated region and the positive electrode coating portion, and the second cover is located at the positive electrode uncoated region side based on the boundary line.

3. The electrode assembly of claim 1, wherein an area of the second cover is three times to six times greater than that of the first cover.

4. The electrode assembly of claim 1, wherein the positive electrode comprises a positive electrode current collector that is formed with a thin metal plate and a positive electrode active material layer that is attached to a positive electrode current collector, and the positive electrode active material layer is formed at both surfaces of the positive electrode current collector,
    the first positive electrode protection tape comprises a first surface that covers one side surface of the positive electrode, a second surface that is bent from the first surface to cover the side end of the positive electrode, and a third surface that is bent from the second surface to cover the other side surface, which is an opposite surface of the one side surface, and
    the first surface covers the positive electrode tab and the side end of a positive electrode coating portion that is formed at one side surface of the positive electrode, and the third surface covers the side end of a positive electrode coating portion that is formed at the other side surface of the positive electrode and a portion in which the positive electrode tab and the positive electrode current collector are welded.

5. The electrode assembly of claim 4, wherein the first positive electrode protection tape comprises a tab cover that is protruded in a length direction of the positive electrode tab, and the tab cover encloses a positive electrode tab that is protruded from the positive electrode current collector.

6. The electrode assembly of claim 1, wherein the positive electrode comprises a positive electrode current collector that is formed with a thin metal plate and a positive electrode active material layer that is attached to the positive electrode current collector, and the positive electrode active material layer is formed at both surfaces of the positive electrode current collector, the first positive electrode protection tape is attached to one surface of the positive electrode, and a second positive electrode protection tape is attached to the other surface of the positive electrode, and the second positive electrode protection tape comprises a third cover that covers the side end of the positive electrode coating portion and a fourth cover that is extended from the third cover and that covers a portion in which the positive electrode tab and the positive electrode current collector are welded.

7. The electrode assembly of claim 1, wherein the negative electrode has a negative electrode coating portion in which a negative electrode active material layer is formed and a negative electrode uncoated region in which a negative electrode active material layer is not formed, and a negative electrode tab is attached to the negative electrode uncoated region, a first negative electrode protection tape is attached to the negative electrode uncoated region, and the first negative electrode protection tape comprises a first cover that covers the side end of the negative electrode coating portion and a second cover that is extended from the first cover and that covers both the negative electrode tab and the negative electrode uncoated region.

8. An electrode assembly comprising a first electrode, a second electrode, and a separator that is disposed between the first electrode and the second electrode, wherein the first electrode has a first electrode coating portion in which a first electrode active material layer is formed and a first electrode uncoated region in which a first electrode active material layer is not formed, and a first electrode tab is attached to the first electrode uncoated region, a first electrode protection tape is attached to the first electrode uncoated region, and the first electrode protection tape comprises a first cover that covers the side end of the first electrode coating portion and a second cover that is extended from the first cover and that covers both the first electrode tab and the first electrode uncoated region.

9. The electrode assembly of claim 8, wherein the first cover is located at the first electrode coating portion side based on a boundary line of the first electrode uncoated region and the first electrode coating portion, and the second cover is located at the first electrode uncoated region side based on the boundary line.

10. The electrode assembly of claim 8, wherein an area of the second cover is three times to six times greater than that of the first cover.

11. The electrode assembly of claim 8, wherein the first electrode comprises a first electrode current collector that is formed with a thin metal plate and a first electrode active material layer that is attached to a first electrode current collector, and the first electrode active material layer is formed at both surfaces of the first electrode current collector, the first electrode protection tape comprises a first surface that covers one side surface of the first electrode, a second surface that is bent from the first surface to cover the side end of the first electrode, and a third surface that is bent from the second surface to cover the other side surface, which is an opposite surface of the one side surface, and the first surface covers the first electrode tab and the side end of a first electrode coating portion that is formed at one side surface of the first electrode, and the third surface covers the side end of a first electrode coating portion that is formed at the other side surface of the first electrode and a portion in which the first electrode tab and the first electrode current collector are welded.

12. The electrode assembly of claim 11, wherein the first electrode protection tape comprises a tab cover that is protruded in a length direction of the first electrode tab, and the tab cover encloses a first electrode tab that is protruded from the first electrode current collector.

13. The electrode assembly of claim 8, wherein the first electrode comprises a first electrode current collector that is formed with a thin metal plate and a first electrode active material layer that is attached to the first electrode current collector, and the first electrode active material layer is formed at both surfaces of the first electrode current collector, the first electrode protection tape is attached to one surface of the first electrode, and a second first electrode protection tape is attached to the other surface of the first electrode, and the second first electrode protection tape comprises a third cover that covers the side end of the first electrode coating portion and a fourth cover that is extended from the third cover and that covers a portion in which the first electrode tab and the first electrode current collector are welded.

* * * * *